(12) United States Patent
Kraus et al.

(10) Patent No.: US 11,399,464 B2
(45) Date of Patent: Aug. 2, 2022

(54) WINDROWER HEADER FLOATATION SYSTEM HAVING ASSISTED DOWNFORCE CONTROL

(71) Applicant: DEERE & COMPANY, Moline, IL (US)

(72) Inventors: Timothy J. Kraus, Blakesburg, IA (US); Austin J. Karst, Bloomfield, IA (US)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 17/075,881

(22) Filed: Oct. 21, 2020

(65) Prior Publication Data

US 2022/0117159 A1 Apr. 21, 2022

(51) Int. Cl.
  *A01D 41/14* (2006.01)
  *F15B 13/04* (2006.01)
  *F15B 1/02* (2006.01)
  *A01B 63/108* (2006.01)

(52) U.S. Cl.
  CPC ......... *A01D 41/141* (2013.01); *A01D 41/145* (2013.01); *F15B 1/02* (2013.01); *F15B 13/04* (2013.01); *A01B 63/108* (2013.01)

(58) Field of Classification Search
  CPC ........ F15B 1/02; A01D 41/145; A01D 41/141
  See application file for complete search history.

(56) References Cited

U.S. PATENT DOCUMENTS

| | | | |
|---|---|---|---|
| 6,901,729 B1* | 6/2005 | Otto | A01D 41/145 56/208 |
| 7,520,115 B2* | 4/2009 | Coers | A01D 41/141 56/15.8 |
| 7,661,251 B1* | 2/2010 | Sloan | A01D 41/145 56/10.2 E |
| 7,971,420 B1* | 7/2011 | Bollin | A01D 41/145 56/208 |
| 8,001,751 B2* | 8/2011 | Ehrhart | A01B 63/1013 56/10.9 |
| 8,230,771 B2* | 7/2012 | Bitter | A01D 41/145 91/404 |
| 9,198,349 B2* | 12/2015 | Ritter | A01D 41/145 |

(Continued)

OTHER PUBLICATIONS

Extended European Search Report and Written Opinion issued in European Patent Application No. 21203053.0, dated Feb. 28, 2022, in 07 pages.

*Primary Examiner* — Thomas E Lazo

(57) ABSTRACT

An agricultural machine includes a float cylinder interconnecting a header linkage system and a frame. A rod side accumulator is in fluid communication with a rod side fluid port of the float cylinder. A float control valve is selectively controllable between an open position allowing fluid communication between a pressure source and the rod side accumulator, and a closed position blocking fluid communication between the pressure source and the rod side accumulator. A downforce accumulator is in fluid communication with a piston side fluid port of the float cylinder. A downforce control valve is selectively controllable between an open position allowing fluid communication between the pressure source and the downforce accumulator, and a closed position blocking fluid communication between the pressure source and the downforce accumulator.

14 Claims, 5 Drawing Sheets

(56) References Cited

U.S. PATENT DOCUMENTS

| | | | |
|---|---|---|---|
| 9,717,180 B2 * | 8/2017 | Teach | A01D 41/145 |
| 10,617,059 B2 * | 4/2020 | Dunn | A01D 41/145 |
| 2011/0283673 A1 * | 11/2011 | Moersch | A01D 41/141 |
| | | | 56/14.9 |
| 2016/0037721 A1 | 2/2016 | Teach et al. | |
| 2018/0153102 A1 * | 6/2018 | Dunn | A01D 41/127 |
| 2019/0200523 A1 * | 7/2019 | Fay, II | A01D 41/145 |
| 2020/0221637 A1 | 7/2020 | Dunn et al. | |

* cited by examiner

WINDROWER HEADER FLOATATION SYSTEM HAVING ASSISTED DOWNFORCE CONTROL

TECHNICAL FIELD

The disclosure generally relates to an agricultural machine, such as a self-propelled windrower, having a header linkage system operable in a float operating condition.

BACKGROUND

Some agricultural machines are configured to receive or connect to a cutter head for cutting standing crop material. Such agricultural machines may be referred to as self-propelled windrowers, and may often be configured to operate with several different styles and/or sizes of cutter heads. Each different size and/or style of cutter head may have different recommended operating settings for a header linkage system connecting the cutter head to the agricultural machine.

The agricultural machine and the attached cutter head may be configured to cut different crop materials. The crop materials include forages and grains. Because the crop materials have different characteristics, the header linkage system and cutter head may have to be positioned differently for different crop materials, or different cutter heads may have to be used for different crop materials.

Two commonly used styles of cutter heads include rotary style cutter heads which are often used for cutting forage crops, and draper style cutter heads which are often used for cutting grain crops. Each of the rotary style cutter heads and the draper style cutter heads may additionally come in different sizes. Both the rotary style cutter heads and the draper style cutter heads may be operated in either a fixed height operating condition, in which a position of the header linkage system is fixed relative to the frame of the agricultural machine so that the cutter head maintains a fixed height above the ground surface, or a float operating condition in which the header linkage system is allowed to move vertically relative to the frame to track the ground surface as the agricultural machine travels across the ground surface.

When operating in the float operating condition, it is desirable for the header linkage system to exhibit different operating characteristics for the different style of cutter heads, i.e., the rotary style cutter head and the draper style cutter head. For example, because the rotary style cutter heads may be moved more quickly across the ground surface compared to the draper style cutter heads, it is often desirable for the header linkage system to be configured to exhibit a quick floatation response to quickly move the cutter head downward to maintain contact with the ground surface. In contrast, because the draper style cutter heads use a sickle cutter-bar, they are moved more slowly across the ground surface than the rotary style cutter heads and are more sensitive to plugging with mud. Accordingly, it is often desirable for the header linkage system to be configured to exhibit a slow floatation response to move the draper style cutter heads downward at a more controlled rate so that the sickle cutter-bar does not dig into the ground surface.

SUMMARY

An agricultural machine is provided. The agricultural machine includes a frame and a header linkage system attached to the frame. The header linkage system is configured for attaching a cutter head to the frame. The agricultural machine further includes a tank operable to store a supply of a fluid, and a pressure source in fluid communication with the tank. The pressure source is operable to receive fluid from the tank and circulate the fluid through a fluid circuit. A float cylinder interconnects the header linkage system and the frame. The float cylinder includes a rod side fluid port and a piston side fluid port. The rod side fluid port is in fluid communication with the pressure source. The rod side fluid port is operable to receive fluid from the pressure source in order to retract the float cylinder. A downforce accumulator is in fluid communication with the piston side fluid port of the float cylinder. A downforce control valve is in fluid communication with the pressure source and the downforce accumulator. The downforce control valve is selectively controllable between an open position and a closed position. When the downforce control valve is disposed in the open position, the downforce control valve allows fluid communication between the pressure source and the downforce accumulator. When the downforce control valve is disposed in the closed position, the downforce control valve blocks fluid communication between the pressure source and the downforce accumulator.

In one aspect of the disclosure, the agricultural machine includes a header controller. The header controller includes a processor and a memory having a header attachment and control algorithm stored thereon. The processor is operable to execute the header attachment and control algorithm to control the downforce control valve to either the open position or the closed position based on a requested float control from an operator. When the downforce control valve is controlled to the open position, the header linkage system may be operated in a first float condition exhibiting a first header float return speed. When the downforce control valve is controlled to the closed position, the header linkage system may be operated in a second float condition exhibiting a second header float return speed.

The first header float return speed is less than the second header float return speed. Accordingly, when operating in the first float condition, the header linkage system returns the cutter head to ground contact at a slower speed than when the header linkage system is operating in the second float condition. The operator may select to operate the header linkage system in the first float condition, for example, when a draper style cutter head is attached to the header linkage system so that the draper style cutter head is slowly returned to ground contact at a controlled rate of speed, i.e., the first header float return speed. In contrast, the operator may select to operate the header linkage system in the second float condition, for example, when a rotary style cutter head is attached to the header linkage system so that the rotary style cutter head is more quickly returned to ground contact at a faster rate of speed, i.e., the second header float return speed.

In one aspect of the disclosure, the agricultural machine further includes a rod side accumulator. The rod side accumulator is in fluid communication with the rod side fluid port. The rod side accumulator defines a rod side volume that is compressible in response to a fluid pressure above a defined rod side set point. The rod side set point may be controlled based on a fluid pressure applied to the rod side volume to define a resistance against extension of the float cylinder. The downforce accumulator defines a piston side volume that is compressible in response to a fluid pressure above a defined piston side set point. The piston side set point may be controlled based on a fluid pressure applied to the piston side volume to define a resistant against retraction of the float cylinder. The piston side set point may be different than the rod side set point. The rod side set point and the piston side set point may be individually controlled by the operator for the specific characteristics of the cutter head attached to the header linkage system to control the force required to lift the cutter head and the downward force that returns the cutter head to ground contact.

In one aspect of the disclosure, the agricultural machine includes a float control valve that is in fluid communication with the pressure source and the rod side fluid port of the float cylinder. The float control valve is selectively controllable between an open position and a closed position. When the float control valve is disposed in the open position, the float control valve allows fluid communication between the pressure source, the rod side fluid port of the float cylinder, and the rod side accumulator. When the float control valve is disposed in the closed position, the float control valve blocks fluid communication between the pressure source and the rod side fluid port of the float cylinder. The float control valve may be opened to control the fluid pressure at the rod side accumulator and the rod side volume of the float cylinder.

In one aspect of the disclosure, the rod side accumulator is disposed within the fluid circuit, between the rod side fluid port and the float control valve. In another aspect of the disclosure, the downforce accumulator is disposed within the fluid circuit, between the piston side fluid port and the downforce control valve.

In one aspect of the disclosure, the agricultural machine includes a system return line interconnecting an output of the pressure source and the tank in fluid communication. A return valve is in fluid communication with the system return line. The return valve is selectively controllable between an open position and a closed position. When the return valve is disposed in the open position, the return valve allows fluid communication through the system return line connecting the pressure source to the tank. With the return valve disposed in the open position, one or both of the float control valve and/or the downforce control valve may be opened to the tank to drain the rod side volume and/or the piston side volume to the tank respectively, thereby reducing fluid pressure in the rod side volume and/or the piston side volume respectively. When the return valve is disposed on the closed position, the return valve blocks fluid communication through the system return line, thereby providing pressurized fluid to the float control valve and the downforce control valve.

In one aspect of the disclosure, the float cylinder may include a double acting hydraulic cylinder. The double acting hydraulic cylinder is operable to extend in response to receiving fluid into the piston side fluid port via the downforce control valve. The double acting hydraulic cylinder is operable to retract in response to receiving fluid into the rod side fluid port via the float control valve.

In one aspect of the disclosure, the agricultural machine may be configured as a self-propelled windrower.

Accordingly, the agricultural machine described above enables the header linkage system to operate in a float operating condition with variable levels of downforce control for different styles of cutter heads and/or different operating conditions. By opening the downforce control valve, the piston side volume is open to tank and the downforce accumulator provides little to no resistance and the header linkage system will provide a slower return to ground contact. By closing the downforce control valve, the downforce accumulator acts as a spring to provide a quick return force to move the header linkage system quickly back into ground contact.

The above features and advantages and other features and advantages of the present teachings are readily apparent from the following detailed description of the best modes for carrying out the teachings when taken in connection with the accompanying drawings.

DETAILED DESCRIPTION

Those having ordinary skill in the art will recognize that terms such as "above," "below," "upward," "downward," "top," "bottom," etc., are used descriptively for the figures, and do not represent limitations on the scope of the disclosure, as defined by the appended claims. Furthermore, the teachings may be described herein in terms of functional and/or logical block components and/or various processing steps. It should be realized that such block components may be comprised of any number of hardware, software, and/or firmware components configured to perform the specified functions.

Terms of degree, such as "generally", "substantially" or "approximately" are understood by those of ordinary skill to refer to reasonable ranges outside of a given value or orientation, for example, general tolerances or positional relationships associated with manufacturing, assembly, and use of the described embodiments.

Figure 2:
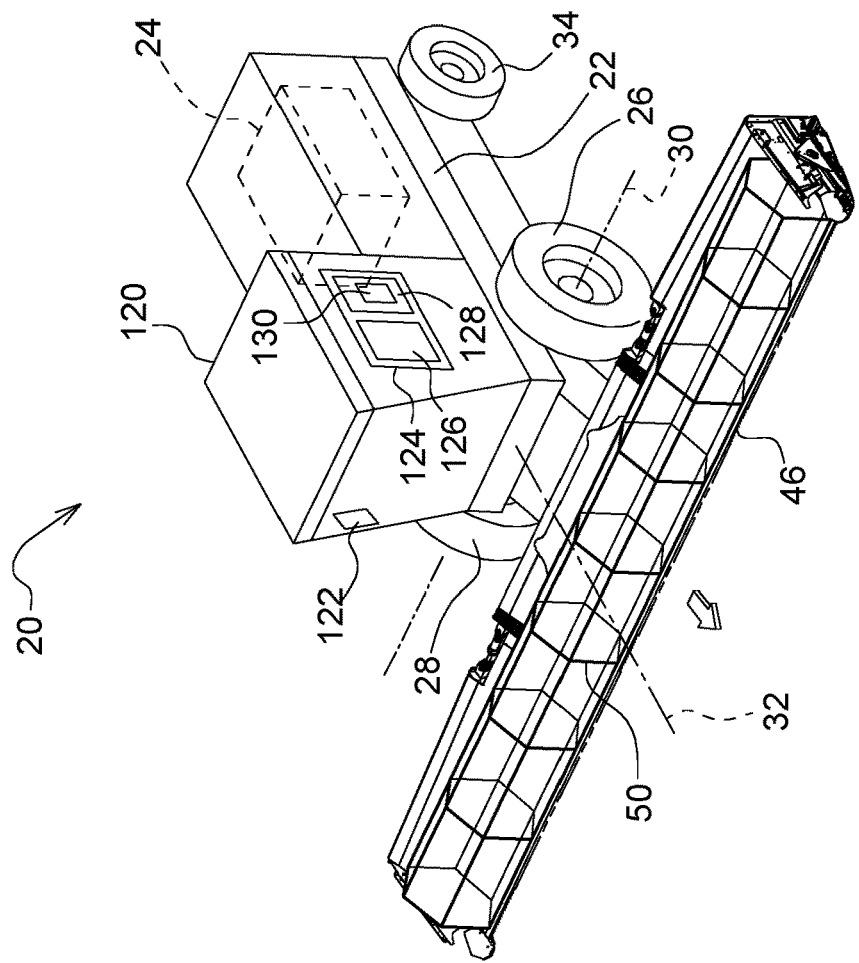
FIG. 2 is a schematic perspective view of the agricultural machine with a draper cutter head attached.
Figure 1:
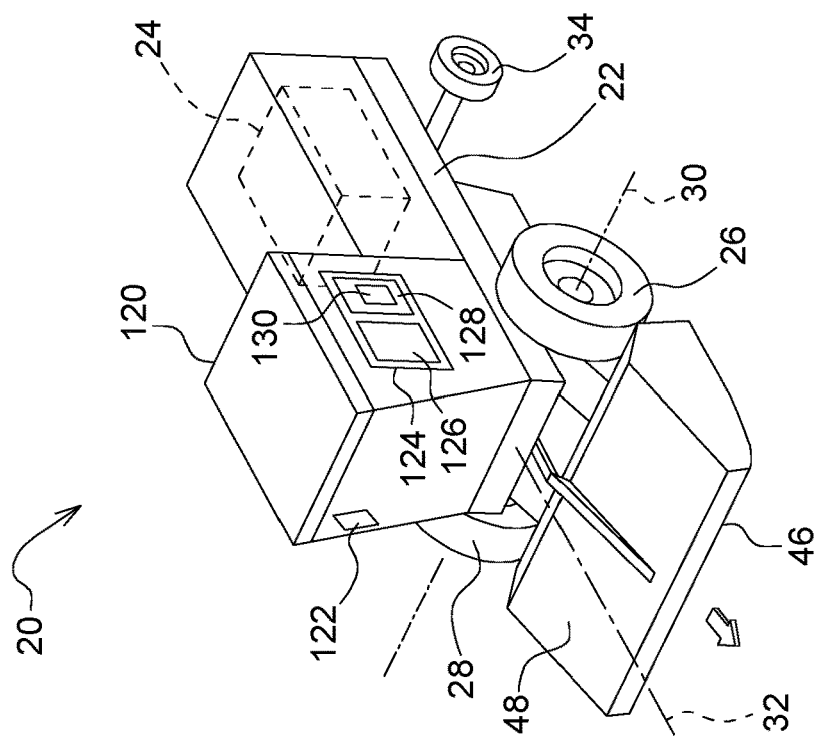
FIG. 1 is a schematic perspective view of an agricultural machine with a rotary cutter head attached.

Referring to the Figures, wherein like numerals indicate like parts throughout the several views, an agricultural machine is generally shown at 20 in FIGS. 1 and 2. The example embodiment of the agricultural machine 20 shown in FIGS. 1 and 2 includes, but is not limited to, a self-propelled windrower. However, it should be appreciated that the teachings of this disclosure may be applied to machines other than the example windrower depicted in the Figures.

Referring to FIGS. 1 and 2, the agricultural machine 20 includes a frame 22, which supports a prime mover 24. The prime mover 24 may include, but is not limited to, an internal combustion engine, an electric motor, a combination of both, or some other device capable of generating torque to power the agricultural machine 20. A left front drive wheel 26 and a right front drive wheel 28 are each mounted to the frame 22, adjacent a forward end of the frame 22. The left front drive wheel 26 and the right front drive wheel 28 are rotatable about a transverse axis 30. The transverse axis 30 is generally perpendicular to a longitudinal axis 32 of the frame 22.

As understood by those skilled in the art, the left front drive wheel 26 and the right front drive wheel 28 may be simultaneously rotated in the same rotational direction and at the same rotational speed about the transverse axis 30 to drive the agricultural machine 20 forward or rearward, depending upon the direction of rotation. Additionally, the left front drive wheel 26 and the right front drive wheel 28 may be rotated in the same rotational direction at different rotational speeds about the transverse axis 30, or in opposite rotational directions at the same or different rotational speeds about the transverse axis 30, in order to turn the agricultural machine 20.

Referring to FIGS. 1 and 2, the agricultural machine 20 further includes a left rear caster wheel 34 and a right rear caster wheel (not shown) attached to the frame 22. As used herein, the term "caster wheel" should be understood to include a wheel that is able to rotate a full three hundred sixty degrees (360°) about a respective generally vertical axis. As such, each of the left rear caster wheel 34 and the right rear caster wheel are rotatable a full three hundred sixty degrees (360°) about a respective generally vertical axis. The left rear caster wheel 34 and the right rear caster wheel may be attached to the frame 22 in a suitable manner. The specific manner in which the left rear caster wheel 34 and the right rear caster wheel are attached to the frame 22 is not pertinent to the teachings of this disclosure, are understood by those skilled in the art, and are therefore not described in detail herein.

Figure 3:
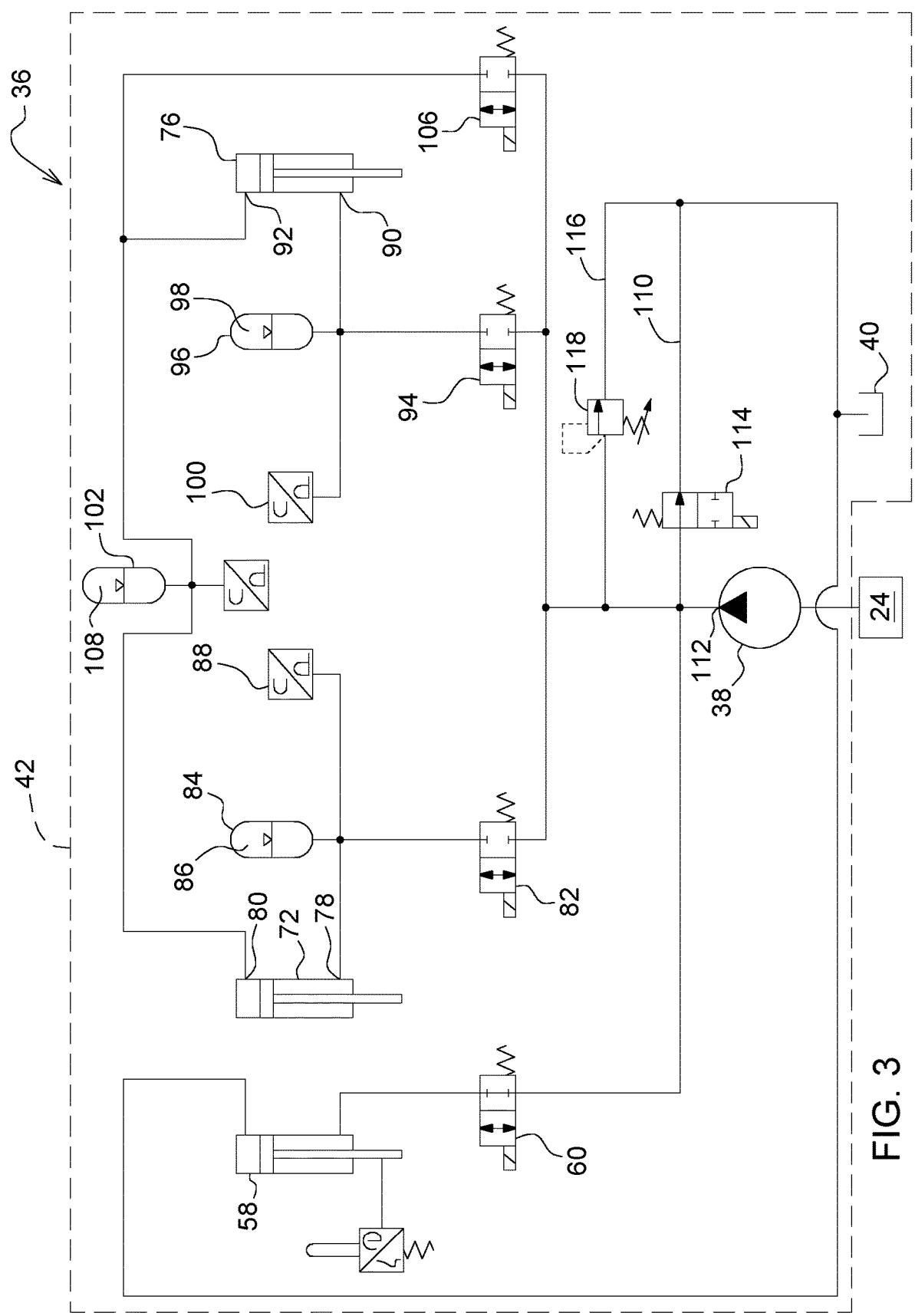
FIG. 3 is a schematic diagram of a hydraulic system of the agricultural machine configured in a second float condition.

Referring to FIG. 3, the agricultural machine 20 includes a hydraulic system 36. The hydraulic system 36 includes a pressure source 38 configured to supply a flow of pressurized fluid. The pressure source 38 may include, but is not limited to, a fluid pump that is drivenly coupled to the prime mover 24. The pressure source 38 draws fluid from a tank 40, and circulates the fluid through a fluid circuit 42. The tank 40 receives the fluid from the hydraulic system 36, stores the fluid, and supplies the fluid to the pressure source 38, e.g., the fluid pump. Fluid flow and/or pressure may be used to operate various components of the agricultural machine 20, as described in greater detail below.

Figure 4:
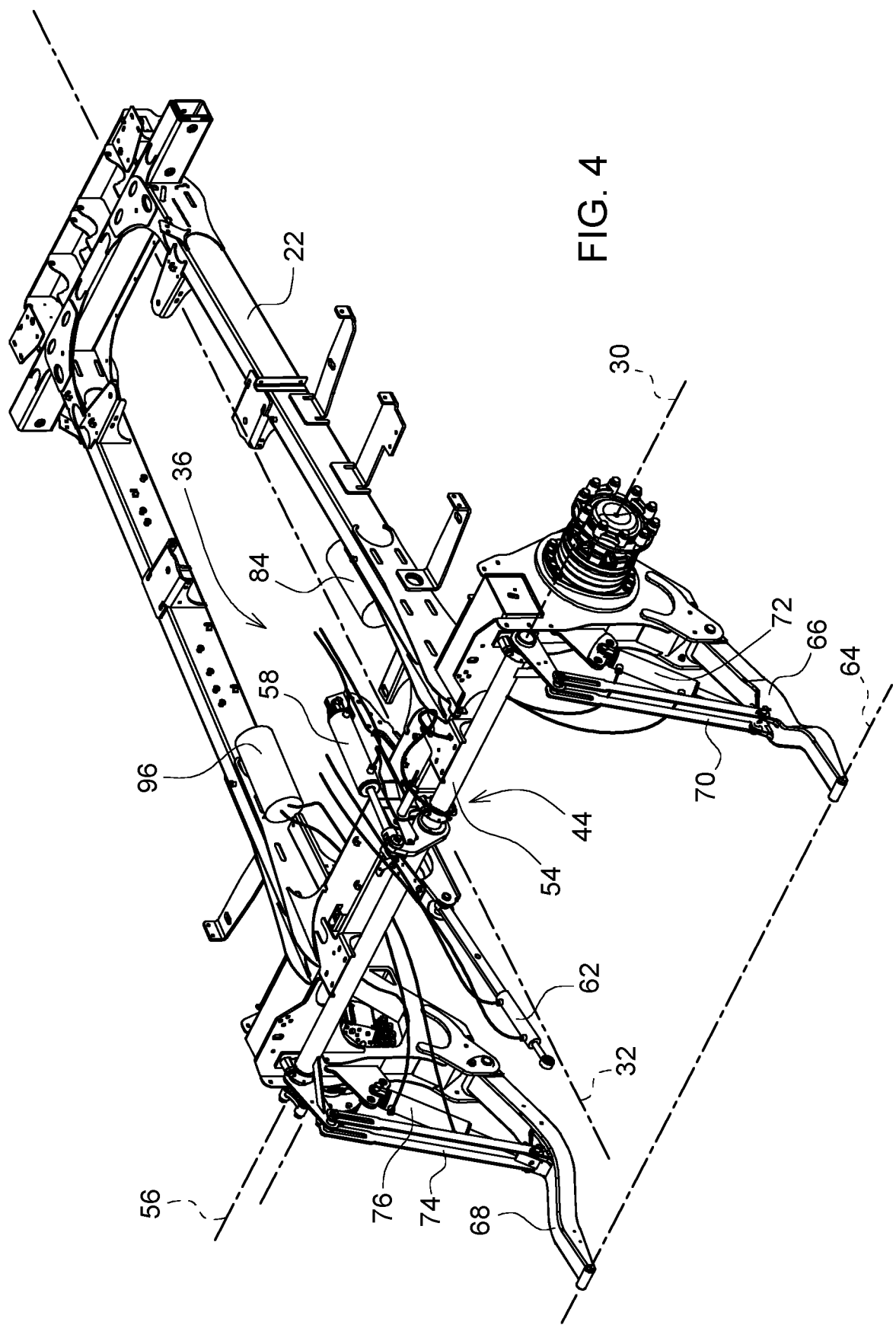
FIG. 4 is a schematic perspective view of a frame and a header linkage system of the agricultural machine.

Referring to FIG. 4, the agricultural machine 20 includes a header linkage system 44 attached to the frame 22. In the implementation shown in the Figures and described herein, the header linkage system 44 is attached to the frame 22 adjacent the forward end of the frame 22. The header linkage system 44 is configured for attaching a selected cutter head 46 from a plurality of different cutter heads 46 to the frame 22. The plurality of different cutter heads 46 may include a rotary cutter 48 such as shown in FIG. 1, or a draper cutter 50 such as shown in FIG. 2. It should be appreciated that the plurality of different cutter heads 46 may further include different sizes of each of the rotary cutter 48 and the draper cutter 50.

The fluid circuit 42 is configured for operating the header linkage system 44 in a float operating condition and a fixed height operating condition. When the fluid circuit 42 is configured to operate the header linkage system 44 in the float operating condition, the header linkage system 44 is allowed to move vertically relative to the frame 22, as the agricultural machine 20 moves across a ground surface, so that the cutter head may track or follow the vertical undulations and changes in the ground surface.

Referring to FIGS. 3 and 4, the header linkage system 44 includes a rockshaft 54 rotatably mounted to the frame 22 for rotational movement about a shaft axis 56 that extends transverse to the longitudinal axis 32 of the frame 22. A lift cylinder 58 is attached to and interconnects the rockshaft 54 and the frame 22. The lift cylinder 58 is operable to rotate the rockshaft 54 about the shaft axis 56 in order to raise and lower the selected cutter head 46er relative to the ground surface. As such, the lift cylinder 58 is operated to control a vertical height of the selected cutter head 46 above the ground surface. In the example implementation described herein, the lift cylinder 58 is a single acting hydraulic cylinder in fluid communication with the hydraulic system 36. A lift control valve 60 controls fluid communication between the lift cylinder 58 and the pressure source 38. In other embodiments, the lift cylinder 58 may include a double acting hydraulic cylinder, an electrically actuated linear actuator, or some other device capable of extending and retracting. The lift cylinder 58 extends in response to fluid pressure and/or flow from the hydraulic system 36 in the usual manner, and is retracted by gravitational forces acting on the header linkage system 44 and/or the selected cutter head 46 attached to the header linkage system 44 as understood by those skilled in the art.

The header linkage system 44 may further include a tilt cylinder 62. The tilt cylinder 62 is attached to and interconnects the frame 22 and the selected cutter head 46 attached to the header linkage system 44. The tilt cylinder 62 is operable to rotate the selected cutter head 46 attached to the header linkage system 44 relative the ground surface. More specifically, the tilt cylinder 62 rotates the selected cutter head 46 about a tilt axis 64, which extends transverse to the longitudinal axis 32 of the frame 22 and through distal ends of a left connecting arm 66 and a right connecting arm 68. In the example implementation described herein, the tilt cylinder 62 is a double acting hydraulic cylinder in fluid communication with the hydraulic system 36. In other embodiments, the tilt cylinder 62 may include a single acting hydraulic cylinder, an electrically actuated linear actuator, or some other device capable of extending and retracting. The tilt cylinder 62 extends and retracts in response to fluid pressure and/or flow from the hydraulic system 36 in the usual manner as understood by those skilled in the art.

The header linkage system 44 includes the left connecting arm 66 and the right connecting arm 68 noted above. The left connecting arm 66 is rotatably attached to the frame 22 below the rockshaft 54, on a left side of the frame 22. A left linkage 70 is attached to and interconnects the left connecting arm 66 and the rockshaft 54. A left float cylinder 72 is attached to and interconnects the frame 22 and the left linkage 70. A respective forward end of the left float cylinder 72 is attached to the left linkage 70. The left float cylinder 72 extends rearward and vertically upward to a respective rearward end of the left float cylinder 72, which is attached to the frame 22.

The right connecting arm 68 is rotatably attached to the frame 22 below the rockshaft 54, on a right side of the frame 22. A right linkage 74 is attached to and interconnects the right connecting arm 68 and the rockshaft 54. A right float cylinder 76 is attached to and interconnects the frame 22 and the right linkage 74. A respective forward end of the right float cylinder 76 is attached to the right linkage 74. The right float cylinder 76 extends rearward and vertically upward to a respective rearward end of the right float cylinder 76, which is attached to the frame 22.

In the example implementation shown in the Figures and described herein, the left float cylinder 72 is a double acting hydraulic cylinder. As is understood by those skilled in the art, the left float cylinder 72 includes a case defining an interior volume. A piston is disposed within the interior volume of the case. A rod is attached to the piston within the interior volume of the case and extends to a distal end positioned outside the case. The piston and the rod are slideably moveable within the interior space and relative to the case to change a length of the left float cylinder 72. The left float cylinder 72 includes a rod side fluid port 78 and a piston side fluid port 80. The rod side fluid port 78 of the left float cylinder 72 is in fluid communication with the pressure source 38 and may receive fluid from the pressure source 38 to retract the left float cylinder 72. The piston side fluid port 80 of the left float cylinder 72 is in fluid communication with the pressure source 38 and may receive fluid from the pressure source 38 to extend the left float cylinder 72.

A left float control valve 82 is in fluid communication with and interconnects the pressure source 38 and the rod side fluid port 78 of the left float cylinder 72. The left float control valve 82 is fluidically positioned between the left float cylinder 72 and the pressure source 38. The left float control valve 82 is selectively controllable between an open position and a closed position. When the left float control is disposed in the open position, the left float control valve 82 allows fluid communication between the pressure source 38 and the rod side fluid port 78 of the left float cylinder 72. The fluid circuit 42 may be controlled so that the left float cylinder 72 is operable to retract in response to receiving fluid into the rod side fluid port 78 of the left float cylinder 72 via the left float control valve 82. Additionally, when the left float control valve 82 is disposed in the open position, the fluid circuit 42 may be controlled to allow fluid communication between the rod side fluid port 78 of the left float cylinder 72 and the tank 40. When the left float control valve 82 is disposed in the closed position, the left float control valve 82 blocks or prevents fluid communication or flow between the pressure source 38 and the rod side fluid port 78 of the left float cylinder 72.

A left rod side accumulator 84 is in fluid communication with the rod side fluid port 78 of the left float cylinder 72. The left rod side accumulator 84 is fluidically positioned within the fluid circuit 42 in fluid communication with and/or between the rod side fluid port 78 of the left float cylinder 72 and the left float control valve 82. As understood by those skilled in the art and as used herein, an accumulator is a pressure vessel that holds a hydraulic fluid and a compressible gas separated by a flexible membrane or piston. The compressible gas is pre-charged to a pre-defined pressure. Hydraulic fluid introduced into the accumulator compresses the compressible gas until the pressure of the compressible gas matches that of the hydraulic fluid. The hydraulic fluid may be forced out of the accumulator by the compressible gas when the pressure of the hydraulic fluid drops below the pressure of the compressible gas. Accumulators may be used, for example, as energy storage devices and/or spring devices in the fluid circuit 42.

The left float cylinder 72 is in fluid communication with the left rod side accumulator 84. The left rod side accumulator 84 defines a left rod side volume 86 that is compressible in response to a fluid pressure above a defined left rod side set point. Fluid pressure within the left rod side volume 86 defined by the left rod side accumulator 84 may be controlled to provide a resistance against extension of the left float cylinder 72, as well as provide dampening or provide a spring affect or spring rate against extension of the left float cylinder 72. A left rod side pressure sensor 88 may be included to sense and monitor the fluid pressure applied to the rod side fluid port 78 of the left float cylinder 72 and the left rod side accumulator 84.

In the example implementation shown in the Figures and described herein, the right float cylinder 76 is a double acting hydraulic cylinder. As is understood by those skilled in the art, the right float cylinder 76 includes a case defining an interior volume. A piston is disposed within the interior volume of the case. A rod is attached to the piston within the interior volume of the case and extends to a distal end positioned outside the case. The piston and the rod are slideably moveable within the interior space and relative to the case. The right float cylinder 76 includes a rod side fluid port 90 and a piston side fluid port 92. The rod side fluid port 90 of the right float cylinder 76 is in fluid communication with the pressure source 38 and may receive fluid from the pressure source 38 to retract the right float cylinder 76. The piston side fluid port 92 of the right float cylinder 76 is in fluid communication with the pressure source 38 and may receive fluid from the pressure source 38 to extend the right float cylinder 76.

A right float control valve 94 is in fluid communication with and interconnects the pressure source 38 and the rod side fluid port 90 of the right float cylinder 76. The right float control valve 94 is fluidically positioned between the right float cylinder 76 and the pressure source 38. The right float control valve 94 is selectively controllable between an open position and a closed position. When the right float control valve 94 is disposed in the open position, the right float control valve 94 allows fluid communication between the pressure source 38 and the rod side fluid port 90 of the right float cylinder 76. The fluid circuit 42 may be controlled so that the right float cylinder 76 is operable to retract in response to receiving fluid into the rod side fluid port 90 via the right float control valve 94. Additionally, when the right float control valve 94 is disposed in the open position, the fluid circuit 42 may be controlled to allow fluid communication between the rod side fluid port 90 of the right float cylinder 76 and the tank 40. When the right float control valve 94 is disposed in the closed position, the right float control valve 94 blocks or prevents fluid communication between the pressure source 38 and the rod side fluid port 90 of the right float cylinder 76.

A right rod side accumulator 96 is in fluid communication with the rod side fluid port 90 of the right float cylinder 76. The right rod side accumulator 96 is fluidically positioned within the fluid circuit 42 in fluid communication with and/or between the rod side fluid port 90 of the right float cylinder 76 and the right float control valve 94. The right rod side accumulator 96 defines right rod side volume 98 that is compressible in response to a fluid pressure above a defined right rod side set point. Fluid pressure within the right rod side volume 98 defined by the right rod side accumulator 96 may be controlled to provide a resistance against extension of the right float cylinder 76, as well as a provide dampening or provide a spring affect or spring rate against extension of the right float cylinder 76. A right rod side pressure sensor 100 may be included to sense and monitor the fluid pressure applied to the rod side fluid port 90 of the right float cylinder 76 and the right rod side accumulator 96.

A downforce accumulator 102 is in fluid communication with the piston side fluid port 80 of the left float cylinder 72 and the piston side fluid port 92 of the right float cylinder 76. A piston side pressure sensor 104 may be included to sense and monitor the fluid pressure applied to the piston side fluid port 80 of the left float cylinder 72, the piston side fluid port 92 of the right float cylinder 76, and the downforce accumulator 102.

A downforce control valve 106 is in fluid communication with the pressure source 38 and the downforce accumulator 102. The downforce control valve 106 is fluidically positioned between the pressure source 38 on one side of the downforce control valve 106, and the downforce accumulator 102, the left float cylinder 72, and the right float cylinder 76 on the other side of the downforce control valve 106. The downforce control valve 106 is selectively controllable between an open position and a closed position.

When the downforce control valve 106 is disposed in the open position, the downforce control valve 106 allows fluid communication between the pressure source 38 and the piston side fluid port 92 of the right float cylinder 76 and the piston side fluid port 80 of the left float cylinder 72. The fluid circuit 42 may be controlled so that the left float cylinder 72 and the right float cylinder 76 are operable to extend in response to receiving fluid into the piston side fluid port 92 of the right float cylinder 76 and the piston side fluid port 80 of the left float cylinder 72 via the downforce control valve 106. Additionally, when the downforce control valve 106 is disposed in the open position, the fluid circuit 42 may be controlled to allow fluid communication between the piston side fluid port 92 of the right float cylinder 76, the piston side fluid port 80 of the left float cylinder 72, and the tank 40. When the downforce control valve 106 is disposed in the closed position, the downforce control valve 106 blocks or prevents fluid communication or flow between the pressure source 38 and the piston side fluid port 92 of the right float cylinder 76 as well as the piston side fluid port 80 of the left float cylinder 72.

The downforce accumulator 102 defines a piston side volume 108 that is compressible in response to a fluid pressure above a defined piston side set point. Fluid pressure within the piston side volume 108 of the downforce accumulator 102 may be controlled to provide a resistance against retraction of the right float cylinder 76 and the left float cylinder 72, as well as a dampening or spring affect against retraction of the right float cylinder 76 and the left float cylinder 72.

In the implementation described herein, the piston side set point of the piston side volume 108 is different than the left rod side set point of the left rod side accumulator 84 or the right rod side set point of the right rod side accumulator 96. The piston side set point, the left rod side set point, and the right rod side set point may be calibrated to provide the desired operating characteristics of the specific cutter head 46 used and current field conditions.

When the downforce control valve 106 is disposed in the open position, the fluid circuit 42 may be controlled to operate the header linkage system 44 in a first float condition. When the header linkage system 44 is operated in the first float condition, the downforce accumulator 102 exhibits a first pressure and the header linkage system 44 exhibits a first header float return speed in response to the first pressure from the downforce accumulator 102. When the downforce control valve 106 is disposed in the closed position, the fluid circuit 42 may be controlled to operate the header linkage system 44 in a second float condition. When the header linkage system 44 is operated in the second float condition, the downforce accumulator 102 exhibits a second pressure and the header linkage system 44 exhibits a second header float return speed in response to the second pressure from the downforce accumulator 102. In the implementation described herein, the first pressure of the downforce accumulator 102 and the first header float return speed are less than the second pressure of the downforce accumulator 102 and the second header float return speed.

The fluid circuit 42 further includes a system return line 110. The system return line 110 interconnects an output 112 of the pressure source 38 and the tank 40 in fluid communication. A return valve 114 is in fluid communication with the system return line 110. The return valve 114 is fluidically positioned between the pressure source 38 and the tank 40, within the system return line 110. The return valve 114 is selectively controllable between an open position and a closed position. When the return valve 114 is disposed in the open position, the return valve 114 allows fluid communication or flow through the system return line 110 to the tank 40. When the return valve 114 is disposed in the closed position, the return valve 114 blocks or prevents fluid communication or flow through the system return line 110 to the tank 40.

The fluid circuit 42 may further include a pressure bypass line 116 including a pressure bypass valve 118. The pressure bypass line 116 and the pressure bypass valve 118 are in fluid communication with and fluidically disposed between the output 112 of the pressure source 38 and the tank 40. In response to fluid pressure within the fluid circuit 42 exceeding a defined maximum, the pressure bypass valve 118 may open to connect the output 112 of the pressure source 38 with the tank 40.

The agricultural machine 20 further includes an operator station 120, which houses control components of the agricultural machine 20. The control components may include, but are not limited to, an output and an input. The output is operable to convey a message to an operator. The input is operable to receive instructions from the operator. In the example implementation described herein, the input and the output are combined and implemented as a touch screen display 122. Messages may be communicated to the operator through the touch screen display 122, and data may be entered by the operator by touching the touch screen display 122 as is understood by those skilled in the art. It should be appreciated that the input and the output may differ from the example implementation described herein and may be separate or combined components. For example, the output may include, but is not limited to, a video only display, an audio speaker, a light board, etc. The input may include, but is not limited to, a mouse, a keyboard, a microphone, etc.

A header controller 124 is disposed in communication with the touch screen display 122, the tilt control valve, the lift control valve 60, the left float control valve 82, the left rod side pressure sensor 88, the right float control valve 94, the right rod side pressure sensor 100, the downforce control valve 106, and the piston side pressure sensor 104. The header controller 124 is operable to receive data entry from the, left rod side pressure sensor 88, the right rod side pressure sensor 100, the piston side pressure sensor 104, as well as the touch screen display 122. The header controller 124 may additionally send messages through the touch screen display 122, and control the operation of the tilt cylinder 62, the lift control valve 60, the left float control valve 82, the right float control valve 94, and the downforce control valve 106. While the header controller 124 is generally described herein as a singular device, it should be appreciated that the header controller 124 may include multiple devices linked together to share and/or communicate information therebetween. Furthermore, it should be appreciated that all or parts of the header controller 124 may be located on the agricultural machine 20 or located remotely from the agricultural machine 20.

The header controller 124 may alternatively be referred to as a computing device, a computer, a controller, a control unit, a control module, a module, etc. The header controller 124 includes a processor 126, a memory 128, and all software, hardware, algorithms, connections, sensors, etc., necessary to manage and control the operation of the touch screen display 122, the tilt cylinder 62, the lift control valve 60, the left float control valve 82, the right float control valve 94, and the downforce control valve 106. As such, a method may be embodied as a program or algorithm operable on the header controller 124. It should be appreciated that the header controller 124 may include any device capable of analyzing data from various sensors, comparing data, making decisions, and executing the required tasks.

As used herein, "controller" is intended to be used consistent with how the term is used by a person of skill in the art, and refers to a computing component with processing, memory, and communication capabilities, which is utilized to execute instructions (i.e., stored on the memory or received via the communication capabilities) to control or communicate with one or more other components. In certain embodiments, the header controller 124 may be configured to receive input signals in various formats (e.g., hydraulic signals, voltage signals, current signals, CAN messages, optical signals, radio signals), and to output command or communication signals in various formats (e.g., hydraulic signals, voltage signals, current signals, CAN messages, optical signals, radio signals).

The header controller 124 may be in communication with other components on the agricultural machine 20, such as hydraulic components, electrical components, and operator inputs within the operator station 120. The header controller 124 may be electrically connected to these other components by a wiring harness such that messages, commands, and electrical power may be transmitted between the header controller 124 and the other components. Although the header controller 124 is referenced in the singular, in alternative embodiments the configuration and functionality described herein can be split across multiple devices using techniques known to a person of ordinary skill in the art.

The header controller 124 may be embodied as one or multiple digital computers or host machines each having one or more processors, read only memory (ROM), random access memory (RAM), electrically-programmable read only memory (EPROM), optical drives, magnetic drives, etc., a high-speed clock, analog-to-digital (A/D) circuitry, digital-to-analog (D/A) circuitry, and any required input/output (I/O) circuitry, I/O devices, and communication interfaces, as well as signal conditioning and buffer electronics.

The computer-readable memory 128 may include any non-transitory/tangible medium which participates in providing data or computer-readable instructions. The memory 128 may be non-volatile or volatile. Non-volatile media may include, for example, optical or magnetic disks and other persistent memory. Example volatile media may include dynamic random access memory (DRAM), which may constitute a main memory. Other examples of embodiments for memory include a floppy, flexible disk, or hard disk, magnetic tape or other magnetic medium, a CD-ROM, DVD, and/or any other optical medium, as well as other possible memory devices such as flash memory.

The header controller 124 includes the tangible, non-transitory memory 128 on which are recorded computer-executable instructions, including a header attachment and control algorithm 130. The processor 126 of the header controller 124 is configured for executing the header attachment and control algorithm 130. The header attachment and control algorithm 130 implements a method of controlling the agricultural machine 20.

The header controller 124 may control the header linkage system 44 for operation between the float operating condition and the fixed height operating condition. When the header linkage system 44 is configured for the fixed height operating condition, the position of the header linkage system 44 is fixed relative to the frame 22 of the agricultural machine 20. When the header linkage system 44 is configured for the float operating condition, the header linkage system 44 allows the selected cutter head 46 to vertically track the ground surface during horizontal movement of the agricultural machine 20 over the ground surface.

The header controller 124 may receive commands from the operator via the touch screen display 122. The commands may include, but are not limited to, a selection of the desired operating condition, i.e., the fixed height operating condition or the float operating condition. If the float operating condition is selected, the header controller 124 may further receive commands from the operator selecting a desired float condition, i.e., the first float condition or the second float condition. The header controller 124 may then control the return valve 114, the downforce control valve 106, the left float control valve 82 and/or the right float control valve 94 to configure the fluid circuit 42 for the selected float condition, i.e., the first float condition or the second float condition.

Figure 5:
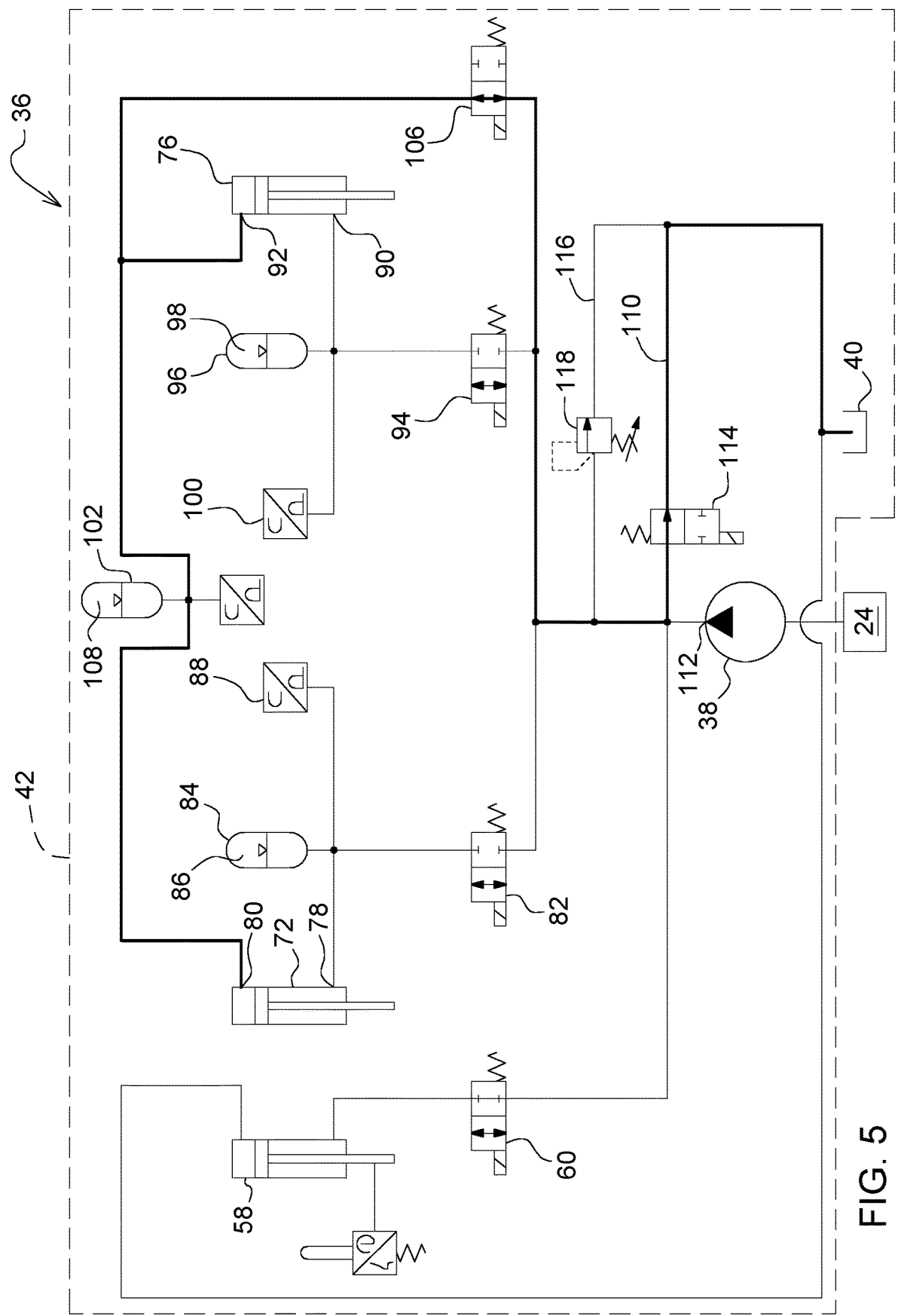
FIG. 5 is a schematic diagram of the hydraulic system configured in a first float condition.

Referring to FIG. 5, control of the fluid circuit 42 for controlling the header linkage system 44 in the first float condition is described. Prior to configuring the fluid circuit 42 as shown in FIG. 5, the header controller 124 may control the return valve 114 into its closed position and the left float control valve 82 and the right float control valve 94 may be controlled into their respective open positions to pressurize the left rod side volume 86 and the right rod side volume 98 to a desired fluid pressure. Once the left rod side volume 86 and the right rod side volume 98 have reached their respective desired fluid pressures, the header controller 124 may control the left float control valve 82 and the right float control valve 94 into their respective closed positions. As shown in FIG. 5, in order to operate the header linkage system 44 in the first float condition, the header controller 124 controls or maintains the left float control valve 82 and the right float control valve 94 in their respective closed positions, controls the downforce control valve 106 into its open position and controls the return valve 114 into its open position. This configuration opens fluid communication between the piston side fluid port 80 of the left float cylinder 72, the piston side fluid port 92 of the right float cylinder 76 and the downforce accumulator 102, with the tank 40 through the return valve 114. When configured this way, the downforce accumulator 102 does not provide any significant damping and does not provide a significant spring affect to and/or does not significantly bias the header linkage system 44 downward. As such, the header linkage system 44 moves downward relative to the frame 22 at the first header float return speed, which is a slower return speed. The first header float return speed is based at least in part on the weight of the cutter head 46, the fluid pressure within the left rod side volume 86 relative to the left rod side set point, and the fluid pressure within the right rod side volume 98 relative to the left rod side set point. The operator may select the first float condition when using the draper cutter 50, which is moved more slowly across the ground surface than the rotary cutter 48, thereby allowing more time to return the cutter head 46 to the ground surface. Additionally, the draper cutter 50 is more sensitive to contacting the ground surface. As such, it is desirable to control it more precisely and/or slowly to ensure that the draper cutter 50 does not contact the ground surface.

Referring to FIG. 3, control of the fluid circuit 42 for controlling the header linkage system 44 in the second float condition is described. Prior to configuring the fluid circuit 42 as shown in FIG. 3, the header controller 124 may control the return valve 114 into its closed position and the left float control valve 82 and the right float control valve 94 into their respective open positions to pressurize the left rod side volume 86 and the right rod side volume 98 to a desired fluid pressure. Once the left rod side volume 86 and the right rod side volume 98 have reached their respective desired fluid pressures, the header controller 124 may control the left float control valve 82 and the right float control valve 94 into their respective closed positions. Additionally, prior to configuring the fluid circuit 42 as shown in FIG. 3, the header controller 124 may control the return valve 114 into its closed position and the downforce control valve 106 into its open position to pressurize the piston side volume 108 to a desired fluid pressure. Once the piston side volume 108 has reached its desired fluid pressure, the header controller 124 may control the downforce control valve 106 into its closed position. As shown in FIG. 3, in order to operate the header linkage system 44 in the second float condition, the header controller 124 controls or maintains the left float control valve 82 and the right float control valve 94 in their respective closed positions. Additionally, the header controller 124 controls or maintains the downforce control valve 106 in its closed position and controls the return valve 114 into its open position. This configuration closes or blocks fluid communication between the piston side fluid port 80 of the left float cylinder 72, the piston side fluid port 92 of the right float cylinder 76 and the downforce accumulator 102 with the tank 40. Additionally, this configuration closes or blocks fluid communication between the left rod side fluid port 78 of the left float cylinder 72 and the left rod side volume 86 and the tank 40, as well as the right rod side fluid port 90 of the right float cylinder 76 and the right rod side volume 98 and the tank 40.

When configured this way, the downforce accumulator 102 provides a significant damping affect and provides a significant spring affect to and/or biases the header linkage system 44 downward. As such, the header linkage system 44 moves downward at the second header float return speed, which is a faster return speed based at least in part on the fluid pressure within the piston side volume 108 relative to the piston side set point in addition to the weight of the cutter head 46, the fluid pressure within the left rod side volume 86 relative to the left rod side set point, the fluid pressure within the right rod side volume 98 relative to the left rod side set point, and the fluid pressure within the piston side volume 108 relative to the piston side set point. As such, the stored energy in the downforce accumulator 102 pushes or biases the cutter head 46 and the header linkage system 44 downward to increase the speed at which the cutter head 46 returns to ground contact. The operator may select the second float condition when using the rotary cutter 48, which is moved more quickly across the ground surface than the draper cutter 50, thereby requiring a quicker return response time, and because the rotary cutter 48 is less sensitive to contacting the ground surface.

Figure 6:
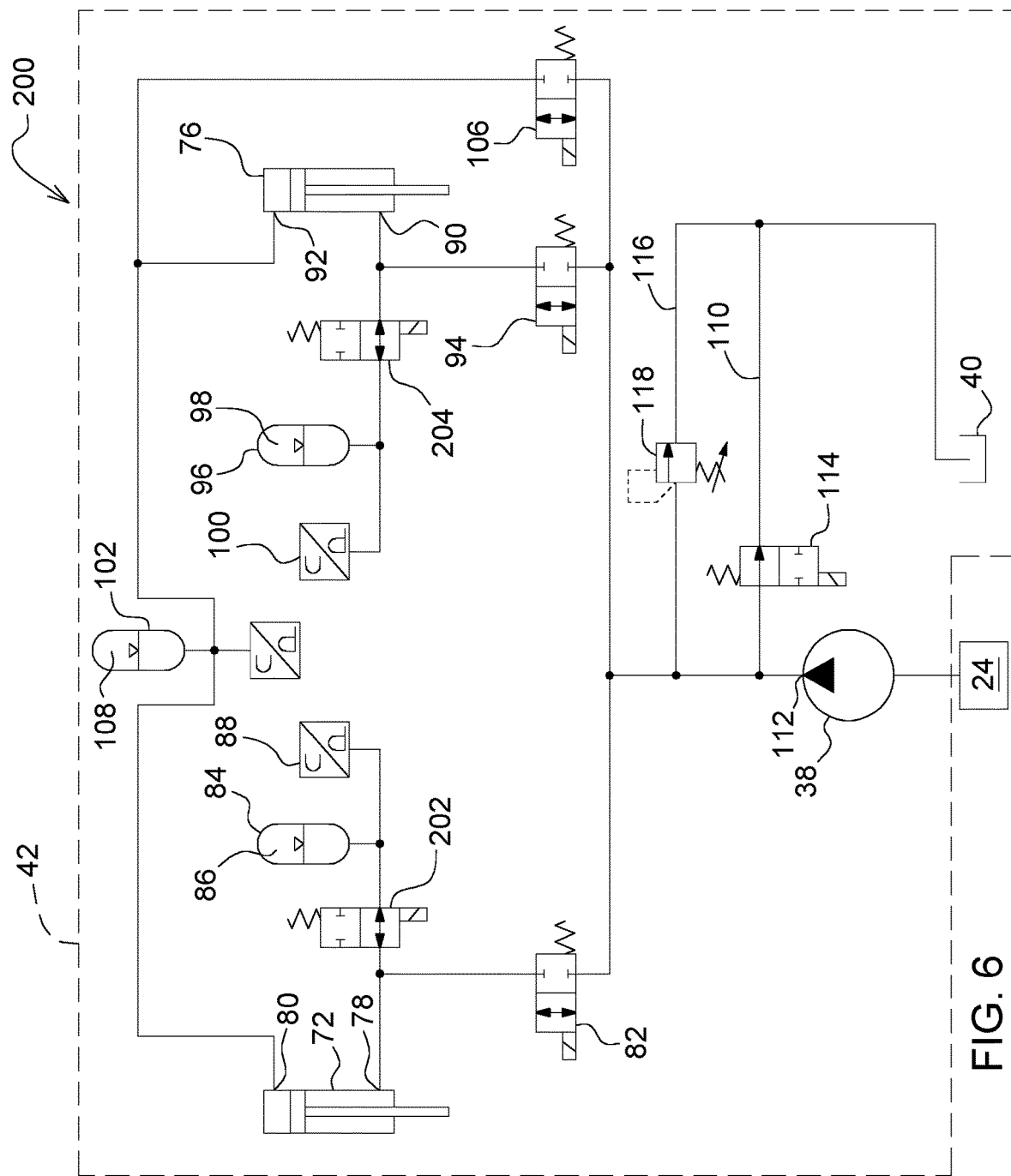
FIG. 6 is a schematic diagram of an alternative embodiment of the hydraulic system configured in the second float condition.

Referring to FIG. 6, an alternative embodiment of the hydraulic system is generally shown in at 200. Reference numerals used to identify features in FIGS. 1-5 are used to identify identical features in FIG. 6. The hydraulic system 200 shown in FIG. 6 eliminates the lift cylinder 58 and the lift control valve 60 shown in FIGS. 3-5. Additionally, the hydraulic system 200 shown in FIG. 6 includes a left lift control valve 202 and a right lift control valve 204.

The left lift control valve 202 is fluidically positioned between the left float control valve 82 and the left rod side accumulator 84 in a position that does not interrupt or interfere with fluid communication between the left float control valve 82 and the rod side fluid port 78 of the left float cylinder 72. The left lift control valve 202 controls fluid communication between the left rod side accumulator 84 and the rod side fluid port 78 of the left float cylinder 72. The left lift control vale 202 is moveable between an open position allowing fluid communication between the left rod side accumulator 84 and the rod side fluid port 78 of the left float cylinder 72, and a closed position blocking fluid communication between the left rod side accumulator 84 and the rod side fluid port 78 of the left float cylinder 72. When the left lift control valve 202 is disposed in its open position, thereby allowing fluid communication between the left rod side accumulator 84 and the rod side fluid port 78 of the left float cylinder 72, the left float cylinder 72 and the hydraulic system 200 may be controlled to operate in either the first float condition or the second float condition as described above with reference to FIGS. 3 and 5. When the left lift control valve 202 is disposed in its closed position, thereby blocking fluid communication between the left rod side accumulator 84 and the rod side fluid port 78 of the left float cylinder 72, the left float cylinder 72 and the hydraulic system 200 may be controlled to raise or lower the header linkage system 44, thereby providing lift functionally to the header linkage system 44.

The right lift control valve 204 is fluidically positioned between the right float control valve 94 and the right rod side accumulator 96 in a position that does not interrupt or interfere with fluid communication between the right float control valve 94 and the rod side fluid port 90 of the right float cylinder 76. The right lift control valve 204 controls fluid communication between the right rod side accumulator 96 and the rod side fluid port 90 of the right float cylinder 76. The right lift control valve 204 is moveable between an open position allowing fluid communication between the right rod side accumulator 96 and the rod side fluid port 90 of the right float cylinder 76, and a closed position blocking fluid communication between the right rod side accumulator 96 and the rod side fluid port 90 of the right float cylinder 76. When the right lift control valve 204 is disposed in its open position, thereby allowing fluid communication between the right rod side accumulator 96 and the rod side fluid port 90 of the right float cylinder 76, the right float cylinder 76 and the hydraulic system 200 may be controlled to operate in either the first float condition or the second float condition as described above with reference to FIGS. 3 and 5. When the right lift control valve 204 is disposed in its closed position, thereby blocking fluid communication between the right rod side accumulator 96 and the rod side fluid port 90 of the right float cylinder 76, the right float cylinder 76 and the hydraulic system 200 may be controlled to raise or lower the header linkage system 44, thereby providing lift functionally to the header linkage system 44.

Accordingly, in the implementation shown in FIG. 6, the left float cylinder 72 and the right float cylinder 76 may provide both the float functionality as well as the lift functionally performed by the lift cylinder 58 and the lift control valve 60 shown in FIGS. 3-5.

As used herein, "e.g." is utilized to non-exhaustively list examples, and carries the same meaning as alternative illustrative phrases such as "including," "including, but not limited to," and "including without limitation." As used herein, unless otherwise limited or modified, lists with elements that are separated by conjunctive terms (e.g., "and") and that are also preceded by the phrase "one or more of," "at least one of," "at least," or a like phrase, indicate configurations or arrangements that potentially include individual elements of the list, or any combination thereof. For example, "at least one of A, B, and C" and "one or more of A, B, and C" each indicate the possibility of only A, only B, only C, or any combination of two or more of A, B, and C (A and B; A and C; B and C; or A, B, and C). As used herein, the singular forms "a", "an" and "the" are intended to include the plural forms as well, unless the context clearly indicates otherwise. Further, "comprises," "includes," and like phrases are intended to specify the presence of stated features, steps, operations, elements, and/or components, but do not preclude the presence or addition of one or more other features, steps, operations, elements, components, and/or groups thereof.

The detailed description and the drawings or figures are supportive and descriptive of the disclosure, but the scope of the disclosure is defined solely by the claims. While some of the best modes and other embodiments for carrying out the claimed teachings have been described in detail, various alternative designs and embodiments exist for practicing the disclosure defined in the appended claims.

The invention claimed is:

1. An agricultural machine comprising:
a frame;
a header linkage system attached to the frame and configured for attaching a cutter head to the frame;
a tank operable to store a supply of a fluid;
a pressure source in fluid communication with the tank and operable to receive fluid from the tank and circulate the fluid through a fluid circuit;
a float cylinder interconnecting the header linkage system and the frame, the float cylinder including a rod side fluid port in fluid communication with the pressure source for receiving fluid from the pressure source to retract the float cylinder, and a piston side fluid port;
a downforce accumulator in fluid communication with the piston side fluid port of the float cylinder;
a downforce control valve in fluid communication with the pressure source and the downforce accumulator, wherein the downforce control valve is selectively controllable between an open position allowing fluid communication between the pressure source and the downforce accumulator, and a closed position blocking fluid communication between the pressure source and the downforce accumulator; and
a header controller configured to control the downforce control valve to the open position to operate the header linkage system in a first float condition exhibiting a first header float return speed, and control the downforce control valve to the closed position to operate the header linkage system in a second float condition exhibiting a second header float return speed, wherein the first header float return speed is less than the second header float return speed.

2. The agricultural machine set forth in claim 1, further comprising a rod side accumulator in fluid communication with the rod side fluid port.

3. The agricultural machine set forth in claim 2, wherein the downforce accumulator defines a piston side volume that is compressible in response to a fluid pressure above a defined piston side set point, and the rod side accumulator defines a rod side volume that is compressible in response to a fluid pressure above a defined rod side set point, wherein the piston side set point is different than the rod side set point.

4. The agricultural machine set forth in claim 2, further comprising a float control valve in fluid communication with the pressure source and the rod side fluid port of the float cylinder, wherein the float control valve is selectively controllable between an open position allowing fluid communication between the pressure source and the rod side fluid port of the float cylinder, and a closed position blocking fluid communication between the pressure source and the rod side fluid port of the float cylinder.

5. The agricultural machine set forth in claim 4, wherein the rod side accumulator is disposed within the fluid circuit between the rod side fluid port and the float control valve.

6. The agricultural machine set forth in claim 4, wherein the float cylinder is a double acting hydraulic cylinder operable to extend in response to receiving fluid into the piston side fluid port via the downforce control valve and retract in response to receiving fluid into the rod side fluid port via the float control valve.

7. The agricultural machine set forth in claim 1 including a system return line interconnecting an output of the pressure source and the tank in fluid communication.

8. The agricultural machine set forth in claim 7, further comprising a return valve in fluid communication with the system return line, wherein the return valve is selectively controllable between an open position allowing fluid communication through the system return line and a closed position blocking fluid communication through the system return line.

9. An agricultural machine comprising:
a frame;
a header linkage system attached to the frame and configured for attaching a cutter head to the frame;
a fluid circuit configured for operating the header linkage system in a float operating condition, wherein the fluid circuit includes:
a tank operable to store a supply of a fluid;
a pressure source in fluid communication with the tank and operable to receive fluid from the tank and circulate the fluid through the fluid circuit;
a float cylinder interconnecting the header linkage system and the frame and operable to extend and retract during operation in the float operating condition, the float cylinder including a rod side fluid port in fluid communication with the pressure source, and a piston side fluid port in fluid communication with the pressure source;
a downforce accumulator in fluid communication with the piston side fluid port of the float cylinder, the downforce accumulator defining a piston side volume that is compressible in response to a fluid pressure above a defined piston side set point;
a rod side accumulator in fluid communication with the rod side fluid port of the float cylinder, the rod side accumulator defining a rod side volume that is compressible in response to a fluid pressure above a defined rod side set point; and
wherein the fluid circuit includes a downforce control valve disposed between the downforce accumulator and the pressure source, wherein the downforce control valve is selectively controllable between an open position allowing fluid communication between the pressure source and the downforce accumulator to operate the header linkage system in a first float condition exhibiting a first header float return speed, and a closed position blocking fluid communication between the downforce accumulator and the tank to operate the header linkage system in a second float condition exhibiting a second header float return speed, wherein the first header float return speed is less than the second header float return speed.

10. The agricultural machine set forth in claim 9, wherein the defined piston side set point is different than the defined rod side set point.

11. The agricultural machine set forth in claim 9, wherein the fluid circuit includes a float control valve disposed between the pressure source and the rod side fluid port of the float cylinder, wherein the float control valve is selectively controllable between an open position allowing fluid communication between the pressure source and the rod side fluid port of the float cylinder, and a closed position blocking fluid communication between the pressure source and the rod side fluid port.

12. A self-propelled windrower comprising:

a frame;

a header linkage system attached to the frame and configured for attaching a cutter head to the frame;

a float cylinder interconnecting the header linkage system and the frame and operable to extend and retract during operation in a float operating condition, the float cylinder including a rod side fluid port and a piston side fluid port;

a downforce accumulator in fluid communication with the piston side fluid port of the float cylinder, the downforce accumulator defining a piston side volume that is compressible in response to a fluid pressure above a defined piston side set point;

a rod side accumulator in fluid communication with the rod side fluid port of the float cylinder, the rod side accumulator defining a rod side volume that is compressible in response to a fluid pressure above a defined rod side set point;

a tank operable to store a supply of a fluid, and a pressure source in fluid communication with the tank and operable to communicate fluid pressure to the rod side fluid port of the float cylinder; and a downforce control valve fluidically disposed between the downforce accumulator and the tank, wherein the downforce control valve is selectively controllable between an open position allowing fluid communication between the downforce accumulator and the tank to operate the header linkage system in a first float condition exhibiting a first header float return speed, and a closed position blocking fluid communication between the downforce accumulator and the tank to operate the header linkage system in a second float condition exhibiting a second header float return speed, wherein the first header float return speed is less than the second header float return speed.

13. The self-propelled windrower set forth in claim 12, further comprising a float control valve fluidically disposed between the pressure source and the rod side fluid port of the float cylinder, wherein the float control valve is selectively controllable between an open position allowing fluid communication between the pressure source and the rod side fluid port of the float cylinder, and a closed position blocking fluid communication between the pressure source and the rod side fluid port.

14. The self-propelled windrower set forth in claim 12, wherein the defined piston side set point is different than the defined rod side set point.

* * * * *